United States Patent [19]
Dalziel et al.

[11] Patent Number: 4,833,554
[45] Date of Patent: May 23, 1989

[54] HARD DISK DRIVE MODULE AND RECEPTACLE THEREFOR

[75] Inventors: Warren L. Dalziel, Monte Sereno; Stephen L. Deremer, Scotts Valley; Michael T. Dugan, Thousand Oaks; Charles D. Flanigan, San Jose; Martin J. Maiers; David P. Moriconi, both of Ben Lomond; Charles I. Peddle, Scotts Valley; Peter Sehnal, La Honda; Glenn M. Stark, Santa Cruz; Kenneth M. Stein, San Jose; Sirjang L. Tandon, Chatsworth; Robert G. Taylor, Jr., Santa Cruz; Gary R. Yeakle, San Jose, all of Calif.

[73] Assignee: Tandon Corporation, Moorpark, Calif.

[21] Appl. No.: 18,499

[22] Filed: Feb. 25, 1987

[51] Int. Cl.⁴ .................................................. G11B 5/012
[52] U.S. Cl. .............................. 360/98.04; 360/98.05; 360/69; 360/75
[58] Field of Search .................................... 360/97–99, 360/133, 69, 97.03, 98.01, 98.04–98.06, 99.06–99.07, 75; 364/708; 361/391–394; D14/102, 106–108

[56] References Cited

U.S. PATENT DOCUMENTS

| | | | |
|---|---|---|---|
| 3,710,357 | 1/1973 | Buslik | 340/174.1 |
| 3,786,454 | 1/1974 | Lissner et al. | 340/174.1 |
| 3,843,967 | 10/1974 | Mulvany | 360/98 |
| 3,849,800 | 11/1974 | Cuzner et al. | 360/97 |
| 3,864,748 | 2/1975 | Herdman et al. | 360/102 |
| 4,005,490 | 1/1977 | Duncan et al. | 360/97 |
| 4,034,411 | 7/1977 | Kraemer et al. | 360/98 |
| 4,062,049 | 12/1977 | Dirks | 360/78 |
| 4,092,687 | 5/1978 | Butsch | 360/102 |
| 4,101,945 | 7/1978 | Butsch | 360/102 |
| 4,359,762 | 11/1982 | Stollarz | 360/98 |
| 4,367,503 | 1/1983 | Treseder | 360/98 |
| 4,479,263 | 10/1984 | Rosenfeldt | 361/391 X |
| 4,556,969 | 12/1985 | Treseder et al. | 369/291 |
| 4,561,610 | 12/1985 | Gyi | 242/198 |
| 4,568,988 | 2/1986 | McGinlay et al. | 360/77 |
| 4,633,350 | 12/1986 | Hanson | 360/98 |
| 4,639,863 | 1/1987 | Harrison | 364/708 X |
| 4,717,982 | 1/1988 | Toreson | 364/708 X |
| 4,742,410 | 5/1988 | Smith | 360/105 |

OTHER PUBLICATIONS

IBM Technical Disclosure Bulletin, vol. 19, No. 10, Mar. 1977, pp. 3846–3847. (Copy in Class 360, Subclass 97.).

IBM Technical Disclosure Bulletin, vol. 20, No. 10, Mar. 1978, pp. 4104–4105.

Baker et al., "An Overview of the Sperry Flight Management Computer System . . . ", IEEE, 1979, pp. 122-128.

Gindi et al., "Design Consideration for the DASTEK 4830 Disk Drive", IEEE Transactions on Magnetics, vol. Mag-17, No. 4, Jul. 1981, pp. 1383–1386. (Copy in 360/97).

Sarisky, "Will Removable Hard Disks Replace the Floppy?", Byte, March 1983, pp. 110–117.

JVC Product Flyer for "Removable Drive System, 20MB Formatted Capacity," undated (obtained at Comdex Computer Show, Las Vegas, Nevada on or about 11/4/87.

Emulex Corp., "DEC–Compatible Product Summary", Jun., 1987, p. 31 (Emulex Removable SCSI Subsystem.).

Primary Examiner—A. J. Heinz
Attorney, Agent, or Firm—Scherlacher, Mok & Roth

[57] ABSTRACT

A portable hard disk drive module enclosing all of the operative components of the disk drive is removably received by a receptacle in a microcomputer system. The disk drive module and the receptacle each have an electrical connector and these connectors are coupled when the module is in an operating position within the receptacle. The connectors comprise the sole interface between the operative components of the disk drive and the remainder of the computer system. The receptacle includes a transport mechanism for moving the module from a load position to the operating position and from the operating position to a module unload position. Accordingly, movement of the module between these positions in the receptacle is completely under machine control.

73 Claims, 11 Drawing Sheets

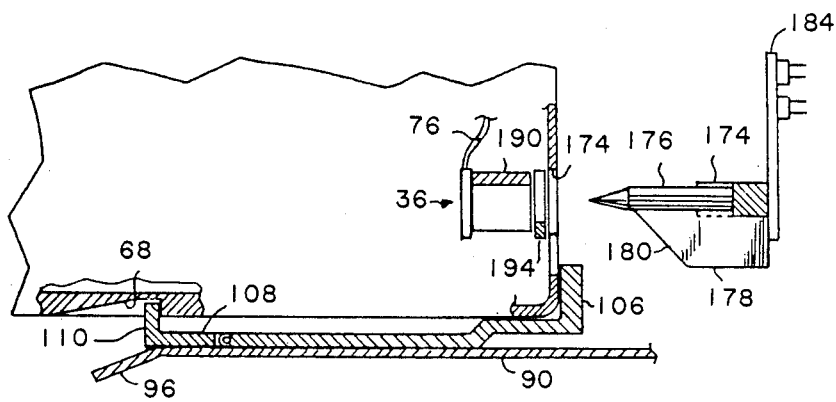
FIG. 14
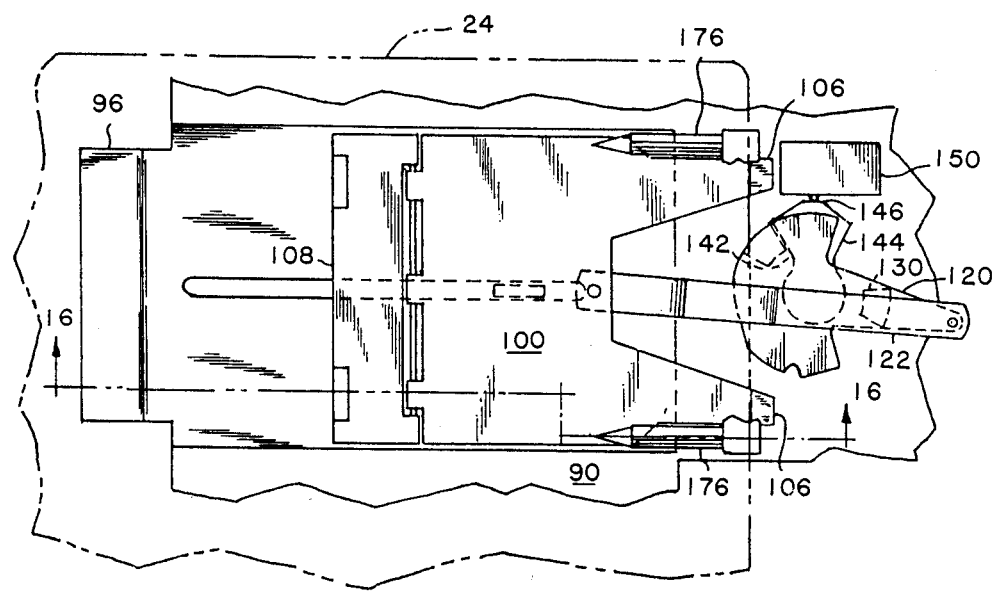
FIG. 15
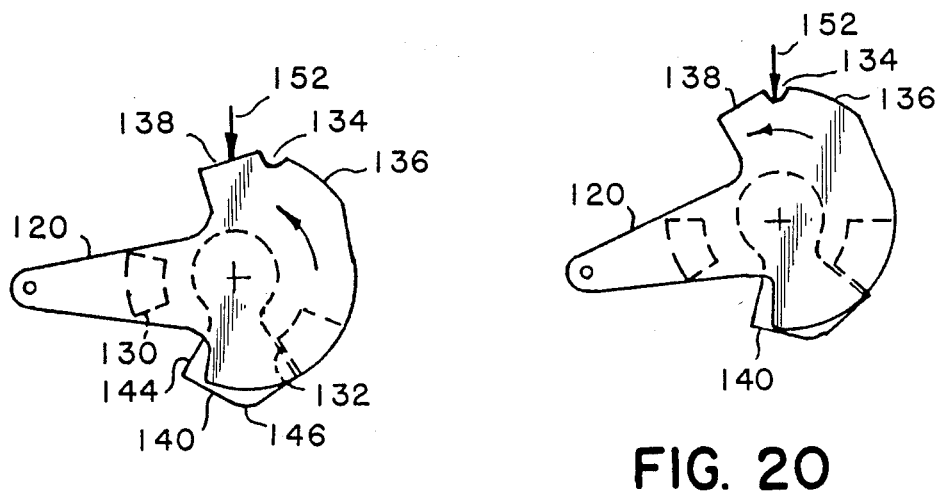
FIG. 19
FIG. 20

HARD DISK DRIVE MODULE AND RECEPTACLE THEREFOR

CROSS-REFERENCES TO RELATED APPLICATIONS

This application is related to the following applications owned by the assignee of the present application:

(1) Application Ser. No. 759,900 filed July 29, 1985 for "Storage Media Transducer Loading/Unloading And Carriage Lock Mechanism", now abandoned;

(2) Application Ser. No. 896,762 filed Aug. 14, 1986 for "Mechanism For Preventing Shock Damage To Head Slider Assemblies And Disks In Rigid Disk Drive", now U.S. Pat. No. 4,724,500 issued Feb. 9, 1988;

(3) Design application Ser No. 019,551 filed Feb. 26, 1987 for "Hard Disk Drive Module";

(4) Application Ser. No. 159,709 filed Feb. 24, 1988 for "Storage Media Transducer Loading/Unloading And Carriage Lock Mechanism", a continuation-in-part of Ser. No. 759,900;

(5) Application Ser. No. 160,501 filed Feb. 25, 1988 for "Disk Drive Controller system";

(6) Application Ser. No. 162,948 filed Feb. 25, 1988 for "Disk Drive Controller System"; and (7) Application Ser. No. 163,183 filed Feb. 25, 1988 for "Storage Media Transducer Loading/Unloading And Carriage Lock Mechanism", a continuation of Ser. No. 759,900 and now abandoned.

FIELD OF THE INVENTION

The present invention relates generally to Winchester or hard disk drives utilized in computer systems and particularly to removable, portable hard disk drive modules interchangeable between computer systems.

BACKGROUND OF THE INVENTION

Hard disk drive systems, also called Winchester drives, have one or more rigid disks rotatably mounted inside a case or "clean chamber" sealed to keep out dust and other foreign matter. Hard disk drives, in contrast to floppy disk drives, are characterized by their high storage capacity and speed of access to stored information.

For several reasons, it is desirable to provide for the removability of the disks by the computer user, and to permit the disks to be interchangeable between computer systems. For one thing, the security of the stored information can be better preserved. Removable and interchangeable hard disks can also serve as backup memories with storage capacities and access speeds unattainable with floppy disks or magnetic tapes.

One approach to hard disk removability and interchangeability is the hard disk cartridge. The disk is enclosed within a housing which, when the cartridge is installed, provides access for the disk drive spindle and read/write head assemblies. Conceptually, this approach resembles that of the floppy disk drive. However, because these hard disk cartridge systems do not have sealed disk chambers and due to handling of the cartridge, the disks and read/write heads are often exposed to unacceptable levels of contamination. Moreover, because the disk is removably coupled to the drive spindle, the required precise, reproducible centering and positioning of the disk relative to the head carriage assembly are difficult to achieve.

U.S. Pat. Nos. 3,849,800 and 4,034,411, issued to IBM, and IBM Technical Disclosure Bulletin, Volume 20, No. 10, March 1978, pp. 4104–05, disclose removable and interchangeable disk file modules which are sealed and enclose the disk and the head carriage assembly. The disk is mounted on a spindle one end of which projects from the module for coupling to a drive motor. These removable disk files do not incorporate components such as the spindle drive motor and therefore require both mechanical and electrical connections with the remainder of the computer system.

U.S. Pat. No. 4,062,049, issued to Burroughs Corporation on Dec. 6, 1977, discloses a self-contained, replaceable and interchangeable "disk file module" requiring only an electrical connector and no external mechanical couplings. The disk file of U.S. Pat. No. 4,062,049, among other drawbacks, is a relatively large, heavy unit utilizing 14-inch disks, is inserted and withdrawn from a mounting rack manually and may be removed while the disk drive is in operation.

SUMMARY OF THE INVENTION

In accordance with an exemplary embodiment, the present invention provides a microcomputer system which includes a portable hard disk dive module enclosing all of the operative components of the drive including at least one hard disk, at least one read/write head operatively associated with the disk for transferring data to and from the disk, a spindle and spindle motor coupled to the disk for rotating the disk, a mechanism for positioning the transducer along the disk and electronic circuits connected to the foregoing components. The module includes an electrical connector coupled to the mentioned circuits.

The preferred embodiment of the invention utilizes a micro hard disk drive, also known as a $3\frac{1}{2}''$ Winchester drive, thereby providing a lightweight, compact, readily transportable unit.

Another aspect of the present invention relates to the receptacle, forming part of the system, for receiving the module. The receptacle has an electrical connector connected to the disk drive power, data and control circuits forming part of the microcomputer system. The receptacle further includes a mechanism for transporting the disk drive module from a module load position to a module operating position and from the operating position to a module unload position. The module and receptacle electrical connectors are adapted to be connected when the module is in the operating position, these connectors comprising the sole interface between the operative components of the disk drive and the remainder of the microcomputer system. The module transporting mechanism is actuated to transport the module to the operating position in response to manual loading of the module, and from the operating position to the unload position in response to a command signal from the microcomputer system. The transporting mechanism includes means for locking the module in the operating position to prevent its withdrawal from the receptacle in the absence of an eject command keyed in by the user. That command causes unloading of the read/write heads from the disks to permit handling of the disk drive module without damage to the heads or disks. The module transporting mechanism is actuated by an electric motor acting through a speed-reducing gear train and a crank mechanism. A cam actuated microswitch, responsive to the position of the module transport mechanism, and a conductive loop established by the module and receptacle connectors, provide control signals for energizing and de-energizing the motor.

BRIEF DESCRIPTION OF THE DRAWINGS

Further features and advantages of the invention will become apparent from the detailed description read with the accompanying drawings in which:

FIG. 14 is a cross section view as seen along 14—14 in FIG. 13 additionally showing portions of the module in relation to the transport mechanism and receptacle connector assembly;

FIG. 15 is a a view similar to that of FIG. 13 showing the configuration of the module transport mechanism in the operational position with the module shown in phantom;

FIGS. 19 and 20 are side elevation views of the crank and cam assembly of the module transport mechanism, showing the angular positions of the assembly during the final stages of the module unloading sequence.

DESCRIPTION OF THE PREFERRED EMBODIMENT

Figure 1:
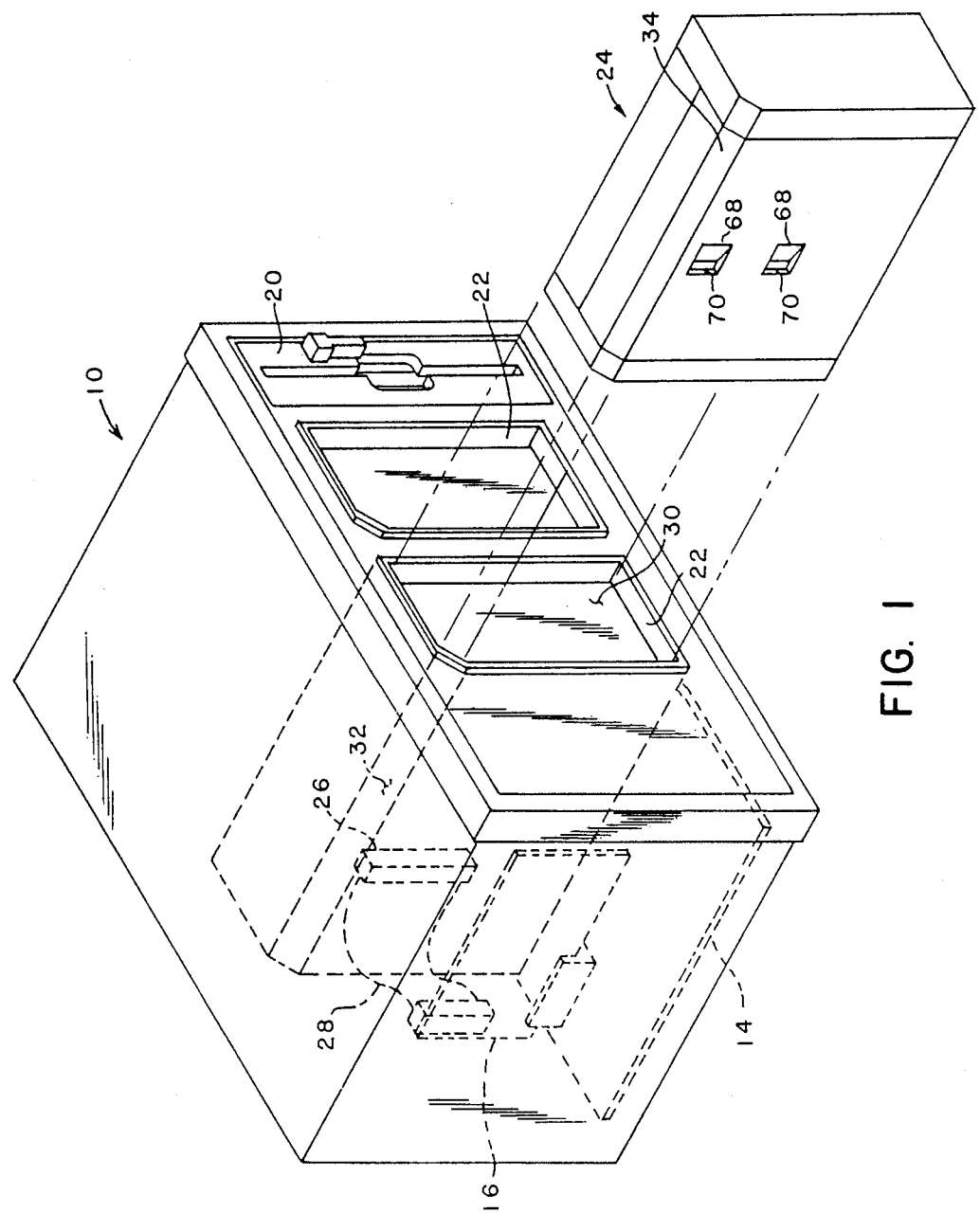
FIG. 1 is an isometric view of a microcomputer system and shows schematically certain aspects of the present invention including a hard disk drive module and receptacles therefor with other features of the microcomputer shown in broken lines.

A microcomputer system 10 employing the features of the present invention is shown schematically in FIG. 1. The system 10, exemplified by the "PAC 286" manufactured by Tandon Corporation, Chatsworth, CA, incorporates standard components including a power supply (not shown) and interconnected printed circuit boards 14 and 16 carrying electronic information and control signal processing circuits all as well known in the art. One of the printed circuit boards 14 is the "mother board" while the other board 16 mounts disk drive circuits which carry power, data and control signals to and from the disk drive. The system 10 may also include a floppy disk drive 20 which, is illustrated in the example of FIG. 1, comprises a standard 5¼" half height unit.

The system 10 has a pair of identical receptacles 22 configured to receive hard disk drive packs or modules such as the module 24. The rear portion of each receptacle encloses an electrical connector assembly 26 connected by a ribbon cable 28 to the disk drive board 16. Hinged to the front portion of each receptacle is a door 30 spring-loaded to the closed position as shown in FIG. 1.

Figure 2:
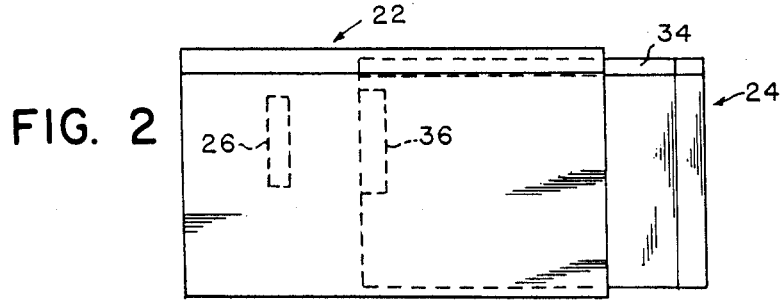
FIG. 2 is a schematic side elevation view of a receptacle in accordance with the invention showing a disk drive module in the initial load position in which it partially projects from the receptacle.
Figure 3:
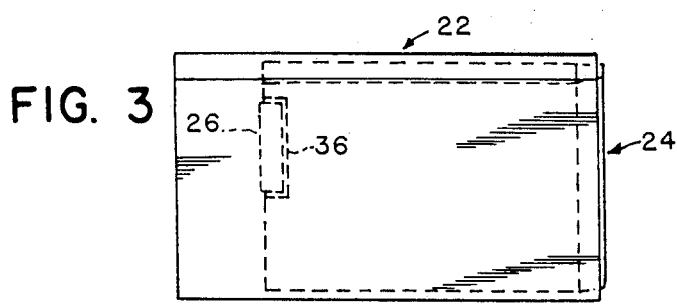
FIG. 3 is a view similar to that of FIG. 2 and shows the disk drive module in its operating position in which it is fully retracted inside the receptacle.

Referring now also to FIGS. 2 and 3, the broader aspects of the invention and its operation will be briefly described. This summary will be augmented by a more detailed explanation below. The module 24 is inserted by the user into the receptacle 22 to a solid stop load position (FIG. 2). Corresponding beveled edges 32 and 34 on the receptacle and module, respectively, assure correct orientation of the module when inserted. The initial insertion of the module pushes open the spring-loaded, hinged receptacle door 30 which remains open until the module is completely removed from the receptacle.

In the load position of the module, a module transport mechanism within the receptacle 22 is energized to move the module to an operating position (FIG. 3) in which the front face of the module is essentially flush with the forward extremity of the receptacle. As the module approaches its operating position, a connector assembly 36 carried by the module adjacent its rear wall is exposed and in the final stage of rearward movement of the module, the receptacle and module connector assemblies 26 and 36 mate to complete the required electrical circuit paths between the operative components inside the module and the disk drive power, data and control circuits in the microcomputer system. Once the module is in the operating position, the disk spindle motor is energized, the head carriage assembly is unlocked, and the read/write heads are loaded onto the disks to permit data transfer to take place. In this connection, reference is made to copending application Ser. No. 759,900 identified above. In the operating position, the module is locked in place and cannot be extracted manually from the receptacle.

To remove the module, the user keys in a command, such as "EJECT 2" (the numeral identifying one of the two receptacles) to initiate the unloading sequence. During this phase, the read/write heads are unloaded from the disk surfaces and the head carriage assembly locked so that the module can be handled without risk of damage to the disk or heads.

Reference in this connection is again made to application Ser. No. 159,709 (which is a continuation-in-part of Ser. No. 759,900) which discloses a head loading/unloading and carriage lock mechanism, and to application Ser.No. 896,762 (now U.S. Pat. No. 4,724,500) which discloses a head capturing or caging mechanism for preventing shock damage to the heads and disk, which applications are to that extent incorporated herein by such reference. Power is then removed from the disk spindle motor and the other disk drive components. Upon completion of this operation, the module transport mechanism is energized to move the module forward to an unload position in which it partially projects from the receptacle. At the end of its forward travel the transport mechanism releases the module and assumes its initial or standby status awaiting the insertion of the same or a different module.

It will be evident from this general description that the sole interface between the operative disk drive components enclosed within the module and the rest of the system is a single electrical connector; no other connections, mechanical or otherwise, are required. Moreover, movement of the module from the initial load position to the operating position, and from the operation position to the unload position, is completely under machine control.

Figure 4:
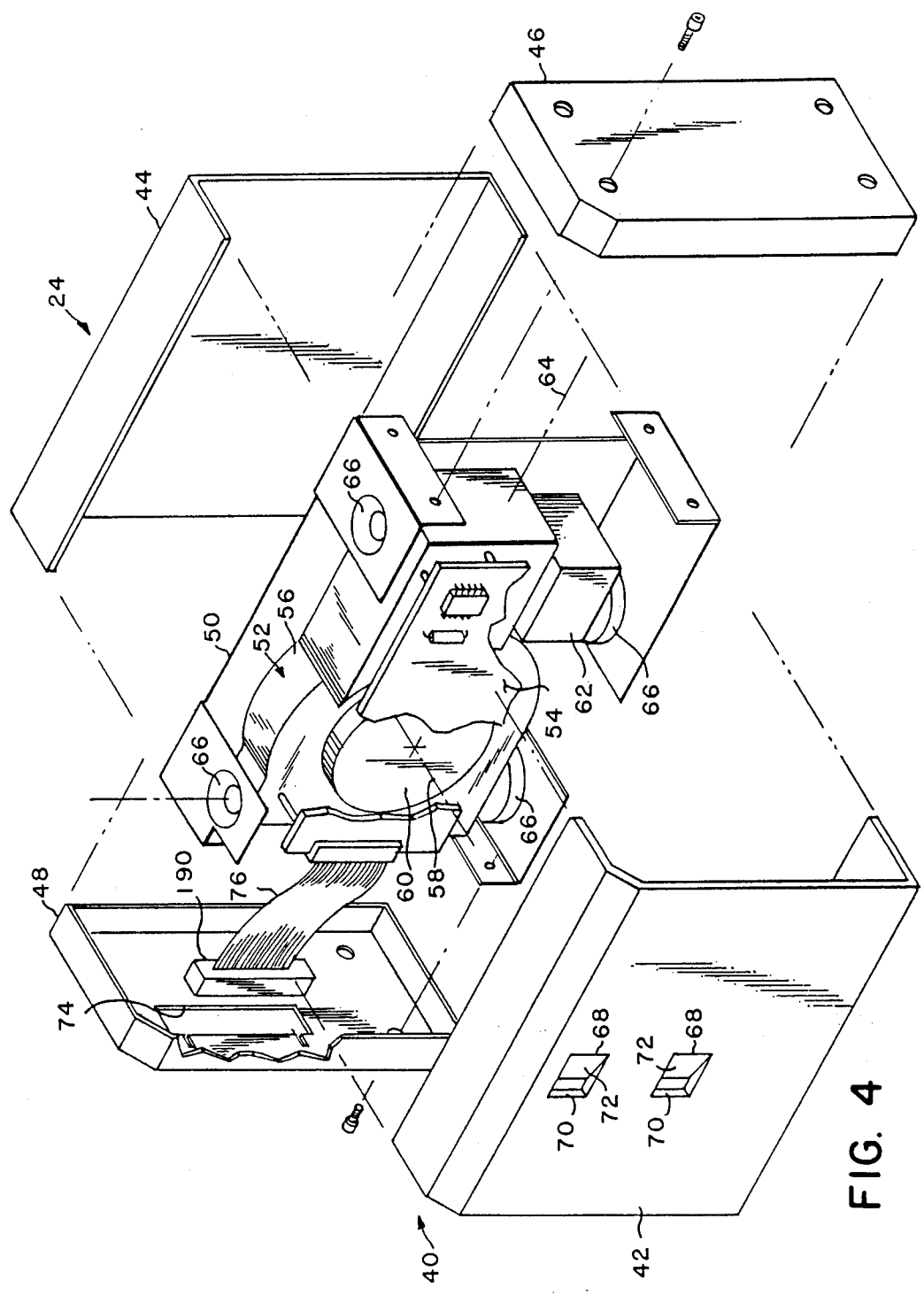
FIG. 4 is an exploded, isometric view of the main elements of the disk drive module of the invention.

Turning now to FIG. 4, the disk drive module 24 includes an enclosure 40 comprising four basic parts: side walls 42 and 44, and front and rear end caps 46 and 48. An edge of one of the side walls 42 and corresponding edges of the ends 46 and 48 define the bevel 34. The module 24 is a compact, rugged, easily transportable unit measuring 2.5×4.75×7 inches in accordance with one practical example known as the "Personal Data Pac," a trademark of Tandon Corporation, Chatsworth, CA.

Retained within the enclosure 40 is a sheet metal chassis 50 carrying a micro hard disk drive 52. Circuits for interfacing the disk drive with the microcomputer system are mounted on a printed circuit board 54 attached to the disk drive case 56. The sealed case 56 defines a "clean chamber" enclosing one or more spindle-mounted disks (not shown) rotatable about an axis 58 by a spindle motor 60. A pair of read/write heads (not shown) within the case 56 transfer data to and from the surfaces of each disk and are movable by a motor 62 under servo control in a generally radial direction 64, perpendicular to the rotational axis 58, to access the various concentric data tracks on the surfaces of the disk. Such disk drives, their components and their operation are well known to those skilled in the art and need not be detailed here.

The disk drive 52 is coupled to the chassis 50 by four anti-shock and vibration mounts 66. The mounts 66 are oriented to provide shock and vibration isolation in all directions.

The outer surface of the side wall 42 of the module enclosure 40 includes a pair of identical recesses 68 which cooperate with the module transport mechanism in a fashion to be presently described. Each recess 68 includes a rear surface 70 perpendicular to the outer surface of the enclosure side wall 42 and a forwardly sloping surface 72.

The rear end of the module enclosure includes a slot 74 in alignment with the electrical connector assembly 36 coupled to the printed circuit board 54 by a ribbon cable 76. Further aspects of this feature will also be explained in greater detail below.

Figure 5:
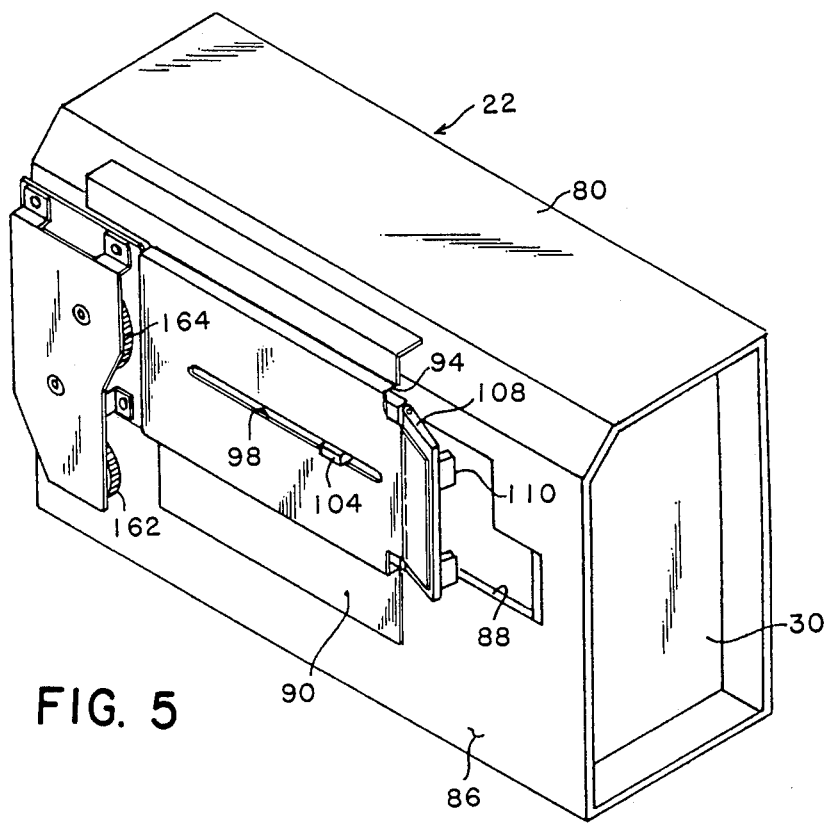
FIG. 5 is an isometric view of the module receptacle and shows portions of the module transport mechanism.
Figure 6:
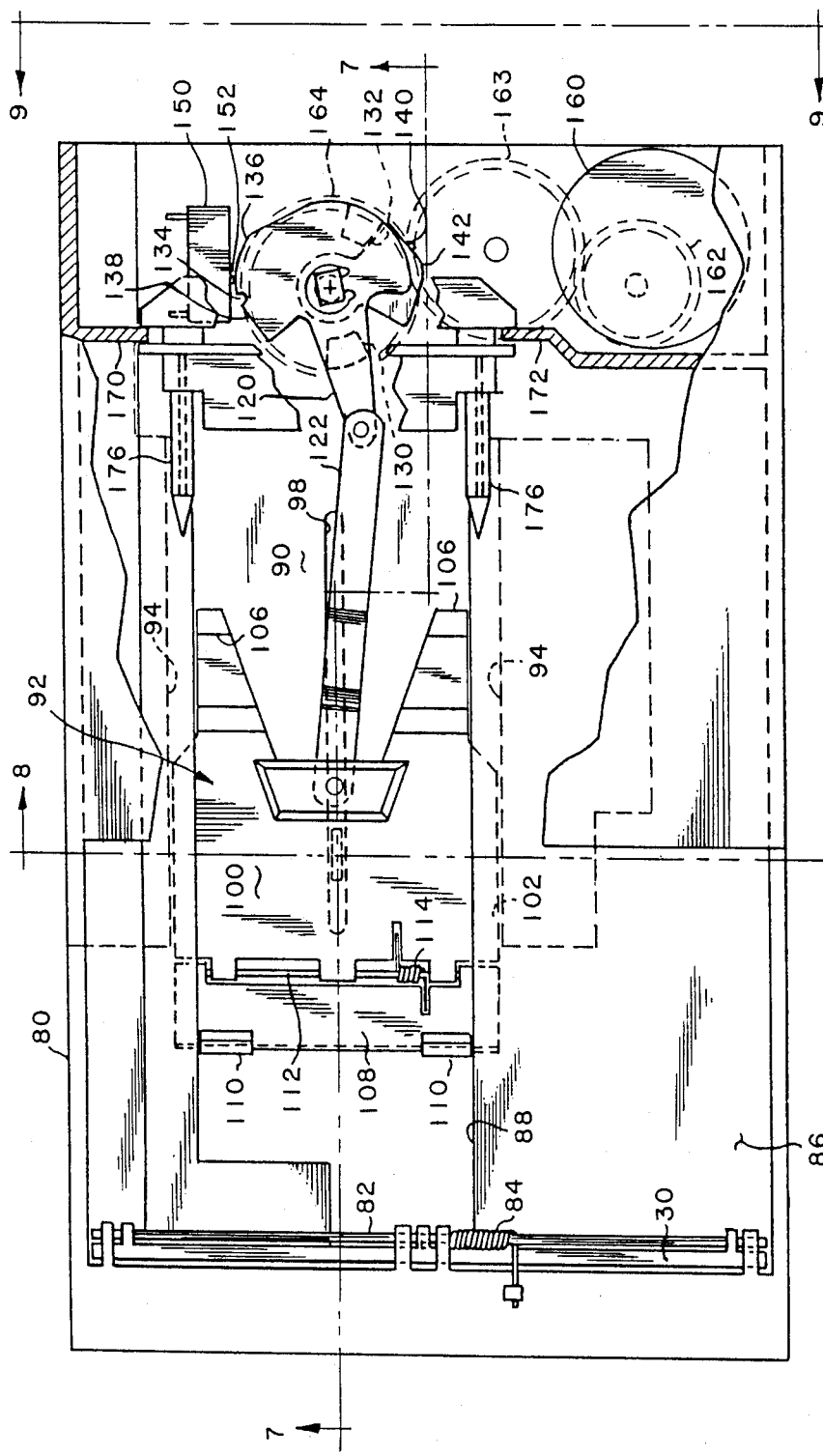
FIG. 6 is a side elevation view, partially broken away, of the receptacle showing details of the module transport mechanism and electrical connector assembly which is adapted to be received by a mating connector on the disk drive module.
Figure 7:
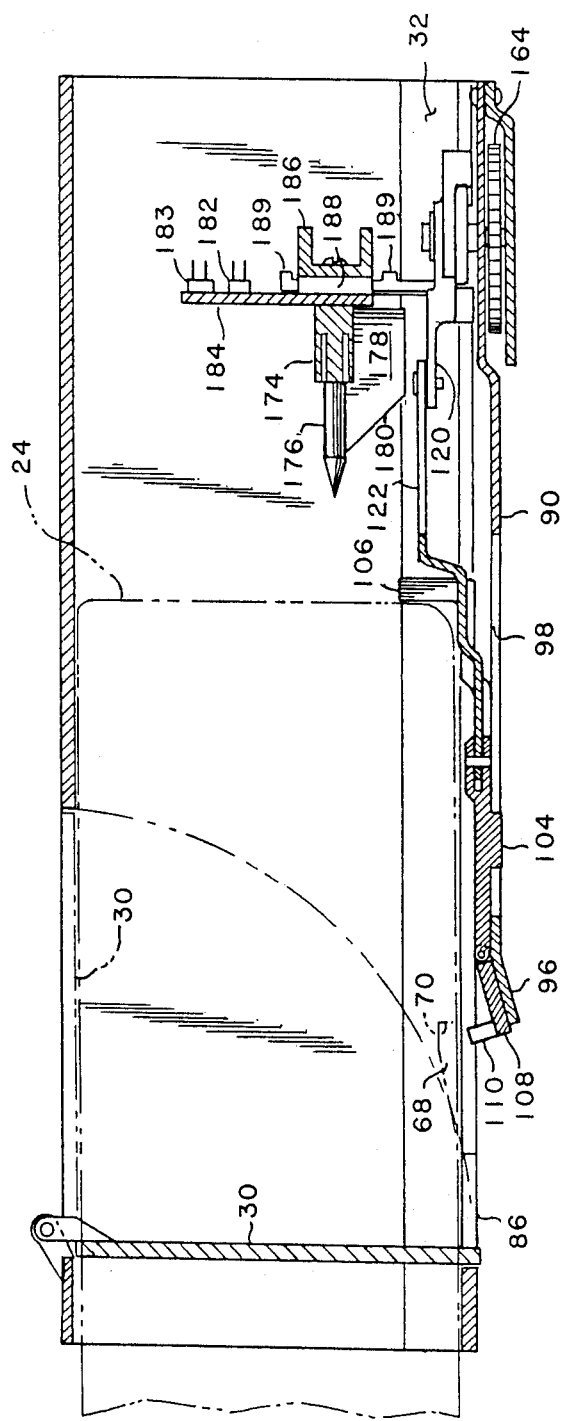
FIG. 7 is a cross section view of the receptacle as seen along 7—7 in FIG. 6.

FIGS. 5-9 show the details of the receptacle 22. The receptacle 22 includes a generally rectangular housing 80 supporting at its forward end the door 30 by means of a hinge pin 82. The door is normally maintained in its closed position, as shown in FIGS. 5-7, by a coil spring 84. Insertion of the disk drive module swings the door open as shown by the broken lines in FIG. 7.

The housing 80 has a side wall 86 which includes a longitudinal slot 88 extending substantially the entire length of the housing. Disposed along the outer surface of side wall 86 and straddling the slot 88 is a frame 90 supporting a module transport mechanism 92. The frame 90 is shaped to define a longitudinally extending guideway 94 and a ramp 96 at the forward extremity of the frame. As best shown in FIGS. 5 and 7, the ramp slopes away from the housing wall 86 in a direction toward the front of the housing. The frame further defines a narrow, longitudinally-extending guide slot 98.

The mechanism 92 includes a reciprocating slide 100 within the frame guideway 94. The slide 100 has side margins 102 overlapped by the edges of side wall 86 adjacent the slot 88, the slide thereby being retained within the confines of the guideway 94. A projection 104 on the slide 100 rides in the slot 98 to keep the slide centered during its travel within the guideway 94.

Disposed on the rear extremity of the slide 100 is a pair of posts 106 adapted to be engaged by the rear face of the module 24 (FIG. 7). The slide 100 further includes a hinged front panel 108 including a pair of inwardly projecting fingers 110 adapted to cooperate with the rear surfaces 70 of the recesses 68 in the side wall of the module. The hinged slide panel 108 is coupled to the main body of the slide by a hinge pin 112 and is biased outwardly by a coil spring 114. The action of the spring 114 causes the panel 108 to bear against the ramp 96 when the slide 100 is in its forward-most position. With reference specifically to FIGS. 5 and 7, in that position of the slide the fingers 110 are clear of the module 24.

Figure 10:
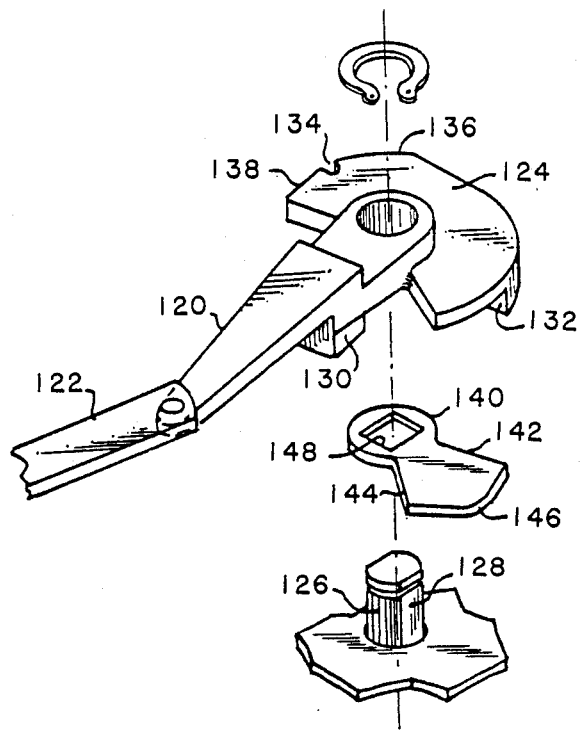
FIG. 10 is an exploded, perspective view showing details of a crank and cam assembly forming part of the module transport mechanism.

With reference now also to FIG. 10 which details a crank and cam assembly, the slide 100 is reciprocated within the guideway 94 by a crank 120 and a stepped connecting link 122. The crank 120 projects from a cam 124 and is fabricated as an integral part thereof. The cam 124 is journaled for rotation on a shaft 126 having flats 128. Projecting from the lower surfaces (as seen in FIG. 10) of the crank 120 and cam 124 are protuberances defining radially-extending abutment surfaces 130 and 132, respectively. The outer surface of the cam 124 defines a short detent or notch 134 straddled by high points or lobes 136 138. The lobe 136 is longer than the lobe 138.

Situated between the cam abutment surfaces 130 and 132 is a plate-like, sector shaped, drive cam 140 having a radially-extending driving edge 142 and a radially-extending trailing edge 144; the angle subtended by these edges is substantially less than that subtended by the abutment surfaces 130 and 132. The periphery of the drive cam 140 defines a peaked lobe 146.

The drive cam 140 has a square hole 148 for receiving the flats 128 of the shaft 126 and is driven thereby. The drive cam, in turn, drives the cam 124 which may therefore be characterized as the follower cam. Because of the difference between the angles subtended by the drive cam edges 142, 144 and the abutment surfaces 130, 132, a lost motion connection is established between the drive and follower cams.

The shaft 126 and cam 140 are driven by a reduction gearmotor 160 through a gear train 162-164 carried by the frame 90. The gear 164 is secured to the shaft 126 whose rotational speed is relatively low on account of the substantial speed reduction provided by the gear motor 160. As will be described, energization of the gearmotor 160 is controlled in part by the microswitch 150.

Figure 9:
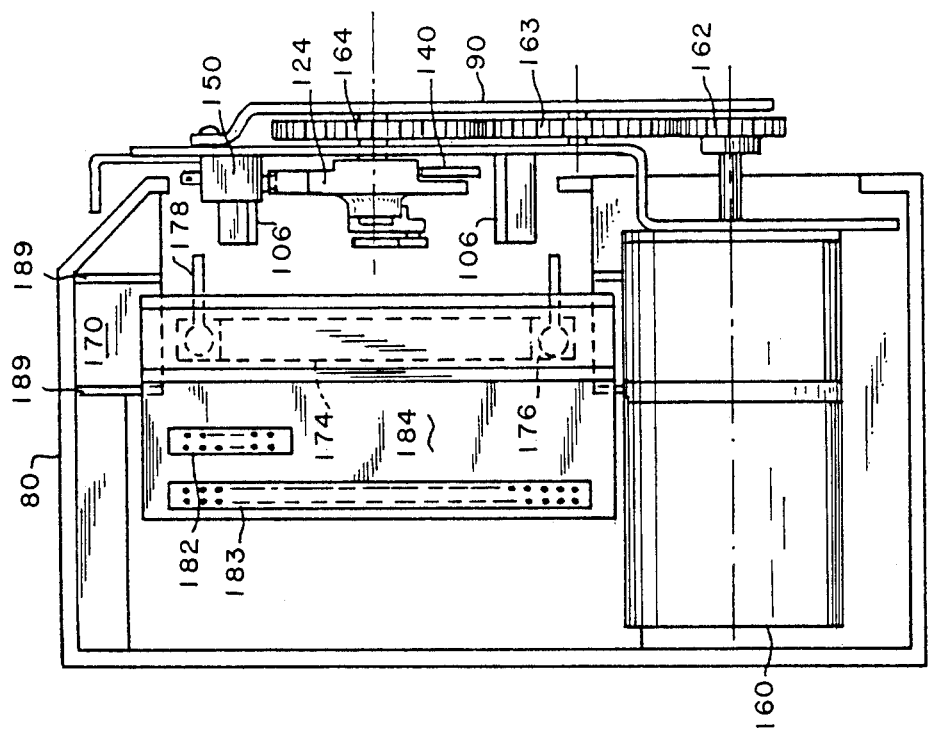
FIG. 9 is an end elevation view of the receptacle as seen along 9—9 in FIG. 6.
Figure 8:
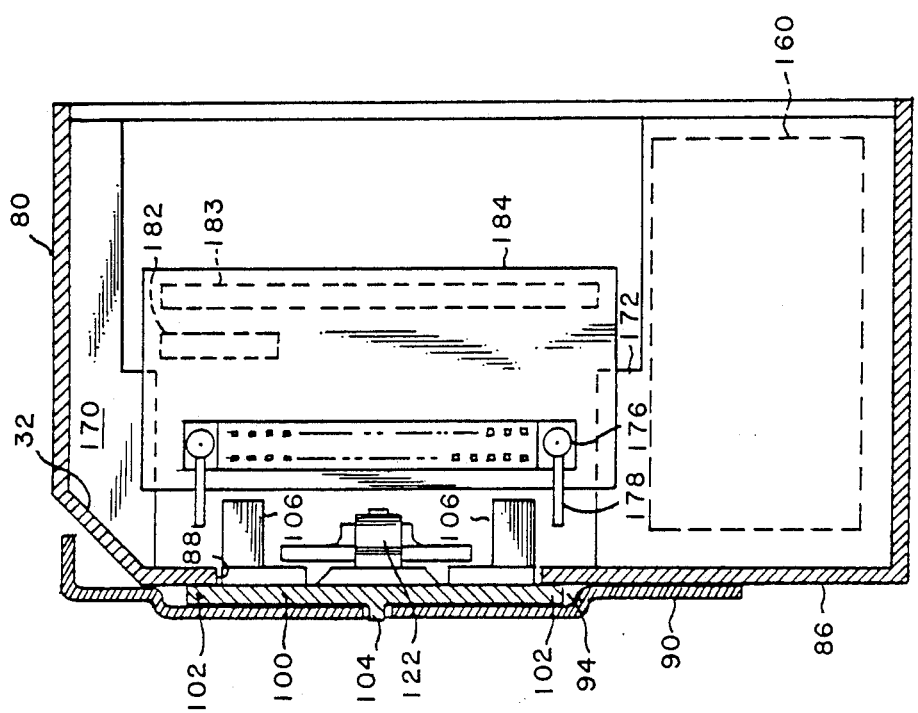
FIG. 8 is a cross section view of the receptacle as seen along 8—8 in FIG. 6.

The structure of the receptacle connector assembly 26 may be best understood by referring to FIGS. 7-9. The assembly 26 is carried by upper and lower partitions 170 and 172 forming part of the receptacle housing 80. The partitions are engaged by the end portions of the assembly 26 which is free to move or float on the partitions to some extent vertically and laterally. The connector assembly 26 consists of a forwardly-facing electrical connector block 174 extending between a pair of longitudinal guide pins 176. Each pin 176 includes a laterally projecting tab 178 having a sloping front camming edge 180. The connector block 174 is electrically connected to terminal blocks 182, 183 by way of a printed circuit board 184. With the receptacle 22 installed in the computer, as shown in FIG. 1, the motor 160 and switch 150 are connected to terminal block 182 and the block 183 is connected to the ribbon cable 28. The assembly 26 further includes a support 186 and spacers 188. The partitions 170, 172 are sandwiched between the ends of the printed circuit board 184 and the support 186 as shown in FIGS. 6-9, the spacers allowing the aforementioned floating of the connector assembly. Vertical movement of the assembly 26 is limited by the spacers and edges of the partitions, while lateral movement is limited by projections 179 on the partitions.

Figure 16:
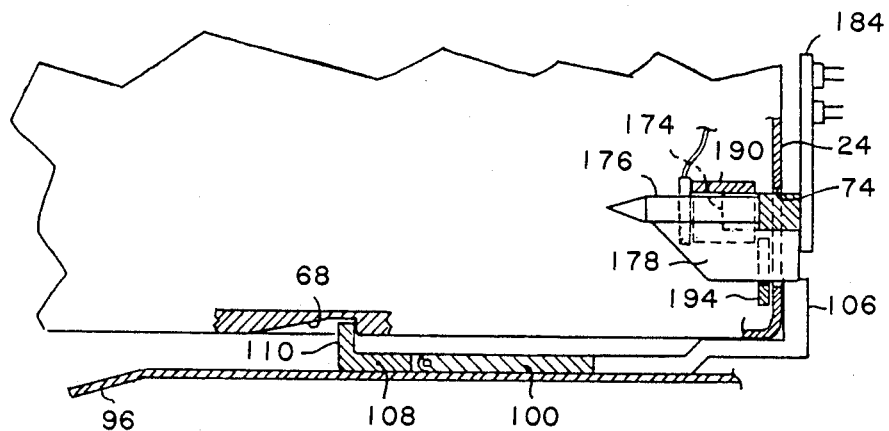
FIG. 16 is a cross section view as seen along 16—16 in FIG. 15 additionally showing portions of the module in relation to the transport mechanism and receptacle connector assembly.
Figure 17:
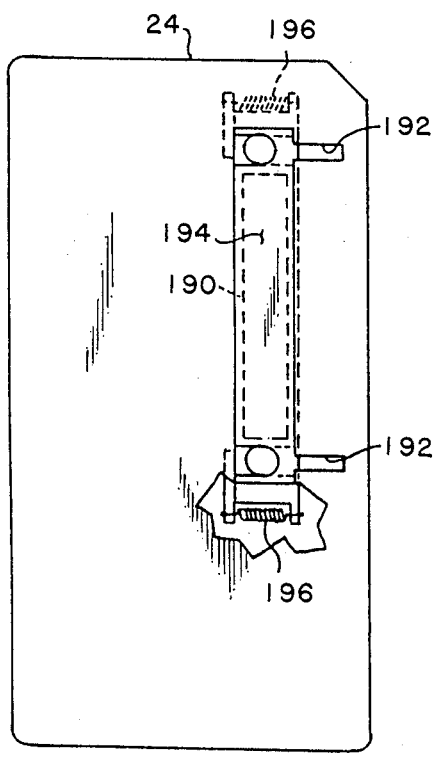
FIG. 17 is a rear, partially cutaway elevation view of the module showing details of a connector shutter assembly with the shutter in its closed position covering the electrical connector of the module.
Figure 18:
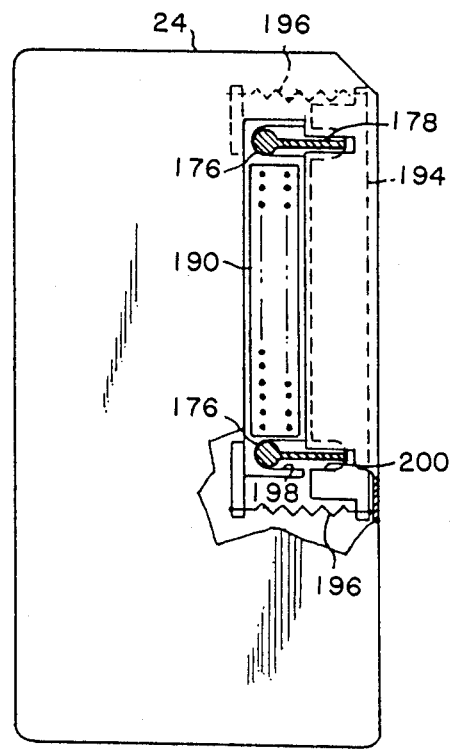
FIG. 18 is a view similar to that of FIG. 17, with portions shown in section, depicting the shutter in its open position in the operating position of the module.

Turning now to FIGS. 14 and 16-18, there is shown in greater detail the electrical connector assembly 36 carried by the module 24 adjacent the access slot 74 in the rear wall of the module enclosure. The connector assembly 36 includes a connector block 190 adapted to receive the receptacle connector block 174. The ends of the access slot 74 include a pair of laterally extending slits 192. A shutter 194, biased to a closed position by tension springs 196, normally covers the module connector block 190 (FIGS. 14, 17). The shutter is slidable to an open position to expose the connector block 190 (FIGS. 16, 18). The module connector block 190 and shutter 194 have pairs of U-shaped cutouts 198 and 200, respectively, the connector block cutouts being in alignment with those in the shutter. As best seen in FIG. 18, the cutouts 198, 200 and slits 192 are separated by the distance between the guide pins 176 and associated tabs 178.

As the module is moved to its operating position, the pointed tips of the guide pins 176 initially align the connector blocks 174 and 190. Then tabs 178 enter the slits 192 and cutouts 198, 200, and the front, sloping edges of the tabs 178 cam the shutter to shift it to its open position allowing the connector block 174 to receive the block 190 to complete the electrical connection between the module and the receptacle.

Figure 11:
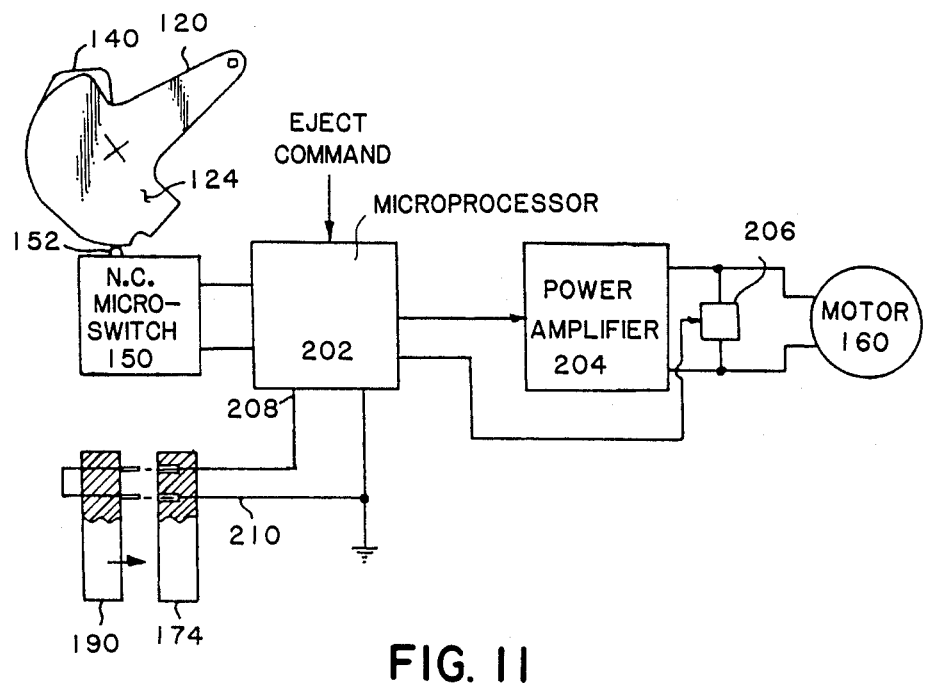
FIG. 11 is a block diagram of a circuit for controlling the transport mechanism motor.
Figure 21:
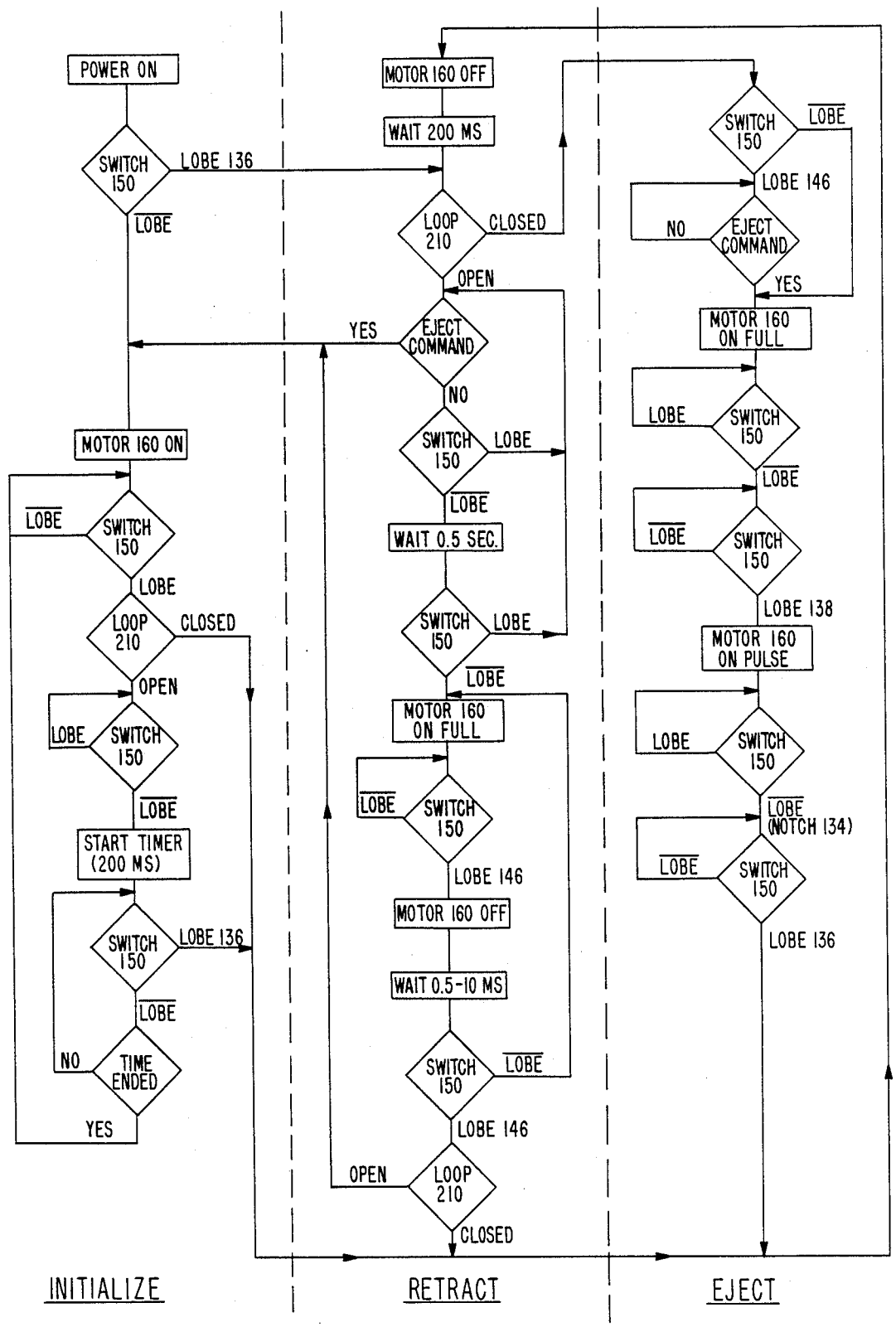
FIG. 21 is a flow chart of the operation of the module transport mechanism.

FIG. 11 shows, in simplified, block diagram form, the main components of a circuit for controlling the energization and de-energization of the gearmotor 160 and hence the operation of the module transport mechanism 92. A related flow chart is shown as FIG. 21. A microprocessor 202 provides appropriately timed on/off control signals to an amplifier 204 which powers the gearmotor 160. The microprocessor also controls an electronic switching circuit 206 connected across the windings of the motor. Switching circuit 206 is operable to connect the motor windings thereby dynamically braking the motor to a rapid stop. Broadly, the microprocessor is responsive to three inputs: first, the microswitch 150 provides signals representing the position of the crank and cam assembly 120, 124, 140, and therefore the position of the transport mechanism 92 including module slide 100; secondly, the microprocessor monitors the status of the receptacle and module connectors 174 and 190 and if these are coupled (indicating that the module is in the operating position), a terminal 208 of the microprocessor is grounded via a loop 210 through the connectors; and thirdly, the microprocessor 202 is responsive to an eject command initiating the module unload cycle. The microprocessor 202, amplifier 204 and switching circuit 206 are preferably mounted on the disk drive controller board 16. It will be evident to workers in the art that the microprocessor may be programmed to provide various timing signals, signal delays and logic functions to control the operation of the transport mechanism as desired; FIG. 21 shows a preferred implementation in this regard.

Figure 12:
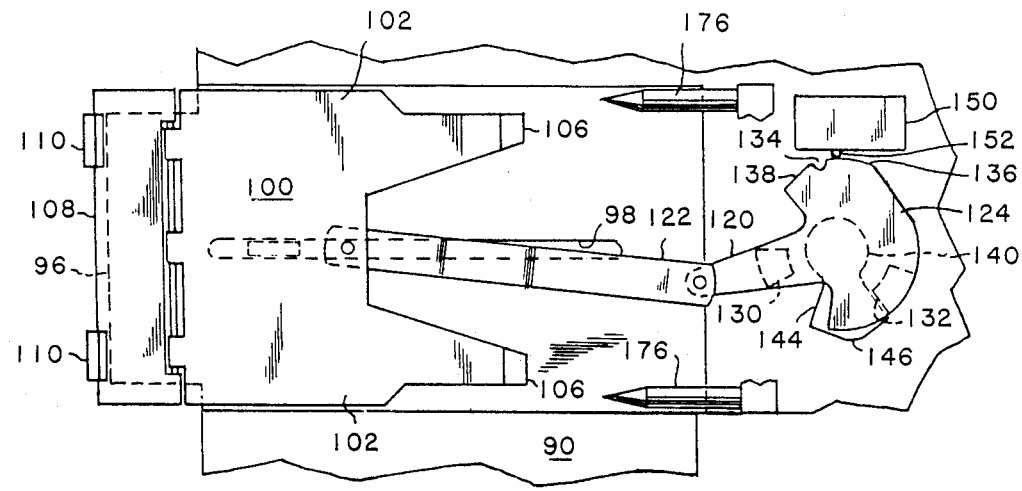
FIG. 12 is a simplified side elevation view of a portion of the receptacle showing the initial or standby configuration of the module transport mechanism.

FIGS. 6, 7 and 12-20 illustrate a typical sequence of operation of the invention. Reference may also be made to FIGS. 11 and 21. FIGS. 6, 7 and 12 show the mechanism in its initial or standby state awaiting insertion of the module 24. The slide 100 is near its forward most position with the crank 120 and link 122 slightly over center, that is, past top dead center relative to the counterclockwise direction of rotation of the crank and cam assembly, as shown. The slide panel 108 is on the ramp 96 and thereby deflected away from the interior of the receptacle so that the fingers 110 do not interfere with the module as it is being inserted. The microswitch plunger 152 is on the cam lobe 136, and the driving edge 142 of the drive cam 140 is in engagement with the abutment surface 132 of the cam 124. With the microswitch 150 and the connector loop 210 (FIG. 11) both open, the system is ready to receive a module.

Figure 13:
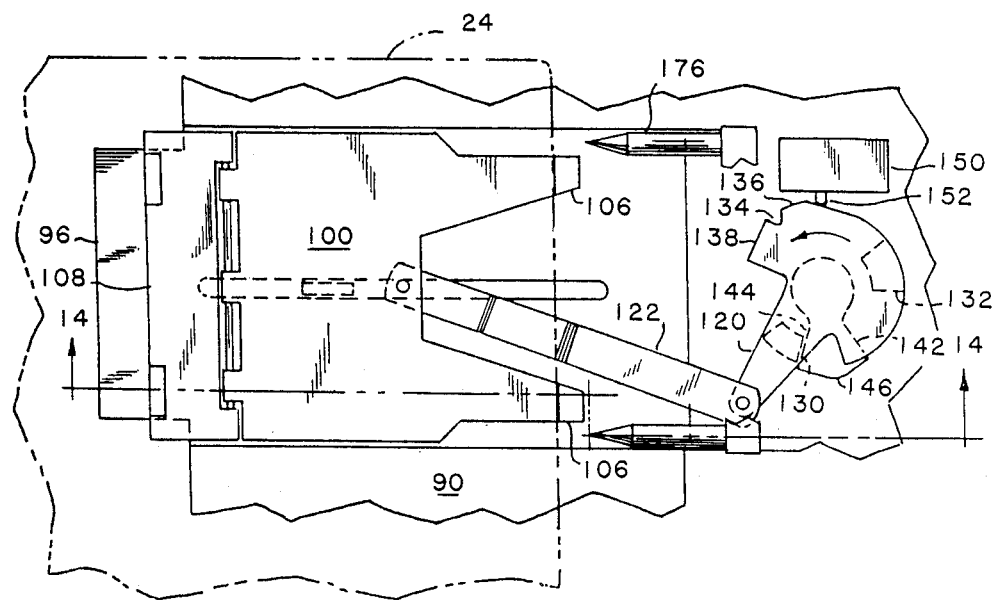
FIG. 13 is a view similar to that of FIG. 12 showing the relative positions of the module, the module transport mechanism, and the receptacle connector assembly during the initial loading phase of the module.

When the user inserts the module 24, pushing it back into the receptacle, the rear surface of the module eventually engages the slide posts 106. Further rearward movement of the module during the manual insertion phase pushes the slide back thereby causing counterclockwise rotation of the cam 124 relative to the stationary drive cam 140 until the abutment surface 130 on the crank/cam assembly engages the trailing edge 144 of the drive cam 140 (FIG. 13). Because of the substantial gearmotor speed reduction ratio, the drive cam is held firmly against rotation and therefore resists further rearward movement of the module thereby providing a solid stop. It will be noted from FIG. 14 that with the initial rearward motion of the slide by virtue of the manual insertion of the module, the hinged slide panel 108 has moved off the ramp 96 and onto the main portion of the frame 90, and that the fingers 110 have thereby entered the recesses 68 in the side of the module. In addition, the described initial counterclockwise rotation of the cam 124 releases the microswitch plunger 152 causing the switch to assume its normally closed state. This signals the control circuitry that a module has been inserted and if, following a brief delay of, for example, 0.5 second, the module is still inserted, the gearmotor is energized to begin counterclockwise rotation of the drive cam 140. Because of the lost motion connection between the cams 124 and 140, the drive cam 140 briefly rotates independently of the cam 124 until the driving edge 142 engages the surface 132 to begin rotation of the cam and crank assembly as a unit. The slide is thereby retracted, the fingers 110 pulling the module with them. As already explained, as the module approaches the operating position, the tips of guide pins 176 align the connector blocks 174 and 190 and the guide pin tabs 178 then cam the shutter to its open position (FIGS. 16, 18) and electrical connection is established by the connector blocks 174 and 190. In response to the actuation of the microswitch 150 by the drive cam lobe 146, gearmotor rotation is halted via dynamic braking and at this point the crank is approximately 10° to 15° before bottom dead center (FIG. 15). After a delay of 200 milliseconds, for example, the microprocessor 202 verifies that connector loop 210 is established and microswitch 150 is open. When the presence of these conditions is verified, the disk drive is powered up, the read/write head carriage assembly is unlocked, the heads are loaded onto the disks and disk drive calibration and operation are initiated. It will be seen from FIG. 15 that the location and length of the drive cam lobe 146 assure that the connectors 174 and 190 are sufficiently engaged and that the crank stops before bottom dead center. Because the crank is stopped before bottom dead center, the module is locked against withdrawal by the stationary drive cam which continues to engage abutment surface 132.

When an Eject command is keyed in, the disk drive is first prepared for ejection which, as already mentioned, includes unloading the read/write heads, locking the head carriage assembly and powering down the disk drive. Following completion of this sequence, the gearmotor 160 is once again energized to drive the crank 120 counterclockwise thereby advancing the slide 100 toward the unload position. The crank and cam assembly positions relative to the microswitch plunger 152 during the final stages of the module unload sequence are shown in FIGS. 19 and 20. When the microswitch plunger contacts the lobe 138 of the cam 124, power to the gearmotor 160 is reduced by "chopping" or switching the power to a pulse width modulation mode with a preselected duty cycle which may be 2 milliseconds "on" and 4 milliseconds "off". Power switching continues as the microswitch returns to its normally closed state when the switch plunger 152 enters the cam notch 134. Upon contact of the switch plunger 152 with the lobe 136 of cam 124, the amplifier 204 providing power to the motor 160 is turned off by the microprocessor 202 and dynamic braking of the motor is initiated by the microprocessor 202 via the switching circuit 206 rapidly bringing the motor 160 and slide 100 to a stop. The transport mechanism is now once again in the initial configuration shown in FIGS. 6, 7 and 12, and the module 24 is ready to be withdrawn from the receptacle 22.

The sequence of operation may also be described with reference to the flow chart of FIG. 21. The chart is divided into three main columns entitled "Initialize", "Retract" and "Eject". A typical operating cycle will, be described When the power to the system is turned on (top lefthand corner of the chart), if the switch plunger 152 is on lobe 136 and the loop 210 is open (indicating the slide 100 is in its initial position awaiting insertion of a module as shown in FIG. 12), the "Retract" sequence (center column of the chart) is followed. Upon insertion of the module until it is stopped by the stationary drive cam and assuming that no Eject command signal is keyed in at this point, the plunger of the switch 150 moves off the lobe 136 (FIG. 13). Following a delay of 0.5 seconds (during which the user may withdraw the module from the receptacle) the motor 160 is turned on and continues running until the switch 150 senses the presence of the lobe 146 on the drive cam 140 indicating that the module has reached its operating position (FIG. 15). At this point the motor is stopped under dynamic braking, switch 150 is interrogated to confirm the continued presence of the lobe 146 and, if the module is in the operating position loop 210 will be closed. (If the loop is open the mechanism goes through an initializing sequence shown in the lefthand column and which will be described below). After a delay of 200 milliseconds (top of "Retract" column), the loop 210 is interrogated and if closed the sequence moves to the righthand "Eject" column. So long as lobe 146 is present at switch 150 and actuating the switch and there is no Eject command recirculation takes place as shown around the Eject command decision point until such command is keyed in by the user and received by the microprocessor 202. The motor is then turned on to advance the transport mechanism from the operating position to the unload position and switch 150 is monitored until it senses the presence of lobe 138 at which time the motor 160 is operated at partial power by pulse width modulating its supply. When the switch 150 is deactuated by the presence of notch 134 and then reactuated by lobe 136 the motor is stopped under dynamic braking, the transport mechanism having arrived at the module unload position (FIG. 12).

If upon powering up the system no lobe is sensed by switch 150, or if upon arrival of the transport mechanism at the operating position the connector loop 210 remains open, or if an Eject command is interposed after system power-up but before retraction is begun, the transport mechanism follows an initialization sequence (left column, FIG. 21). Essentially, this sequence is followed if the transport mechanism is in an unkown condition upon system power-up. The purpose of the initialization sequence is to bring the transport mechanism into its initial state ready to receive a module (FIG. 12). The motor is turned on and if a lobe is sensed and the loop 210 is closed then the module is at the operating position (the lobe that is sensed would in that case be lobe 146) in which case the motor is turned off (top of middle column). On the other hand, if the loop 210 is open the system must determine the position of the cam 124. This is accomplished by using the unique length of the notch 134 as a reference or index.

More specifically, when it is determined that the loop 210 is open, the switch 150 begins monitoring for the onset of the first $\overline{\text{LOBE}}$ condition, that is, the first deactuation of the switch. Upon occurrence of that event, a 200 millisecond timer is started by the microprocessor 202 and the switch begins to monitor for the next switch actuation. The notch 134, because it represents by far the shortest of the possible $\overline{\text{LOBE}}$ conditions, invariably traverses the microswitch plunger position in much less than 200 milliseconds. Accordingly, if a lobe is sensed by the microswitch 150 within the 200 millisecond time period, it will be lobe 136 in which case the transport mechanism will be in its initial state and the motor is stopped. On the other hand, if no lobe has been sensed by the end of the time eriod, the sequence loops back to the beginning of the cycle, the switch 150 monitoring for the onset of the next lobe.

It will be seen that this notch detection arrangement makes possible the use of a single switch which minimizes cost and adjustment of the components.

Other ways of implementing the control of the motion of the transport mechanism will be apparent to those skilled in the art based on the description that has been given. For example, time delays can be provided at appropriate points to mask noise, that is, to provide for switch debouncing and contact settling.

What is claimed is:

1. In a microcomputer system including disk drive power, data and control circuits, the combination comprising:

a removable, portable hard disk drive module enclosing all of the operative components of the disk drive and including an electrical connector connected to control the operative components of the disk drive;

a receptacle for receiving the disk drive module and having an electrical connector connected to the disk drive power, data and control circuits, the module connector being adapted to be coupled to the receptacle connector when the module is in an operating position within the receptacle; and means for transporting the module from a module load position to said module operating position and from said operating position to a module unload position.

2. The combination, as set forth in claim 1, in which:
the module transporting means is actuated to transport the module from the load position to the operating position in response to manual loading of the module, and from the operating position to the unload position in response to a command signal from the microcomputer system.

3. The combination as set forth in claim 1, in which:
the module transporting means includes means for locking the module in the operating position to prevent withdrawal of the module from the receptacle.

4. the combination, as set forth in claim 1, in which:
the electrical connectors comprise the sole interface between the operative components of the disk drive and the remainder of the microcomputer system.

5. The combination, as set forth in claim 1, in which the module transporting means comprises:

a reciprocating slide having means for engaging the module;

a crank and link mechanism connected to the slide for retracting the slide from the module load position to the module operating position, and for advancing the slide from the operating position to the module unload position;

means for providing electrical control signals in response to the angular position of the crank; and a motor for rotating the crank in response to said electrical control signals.

6. The combination, as set forth in claim 5, in which:
the control signal-providing means includes a cam assembly and an electrical switch actuated in response to the angular position of the cam assembly.

7. The combination, as set forth in claim 6, in which the cam assembly comprises:

a generally sector-shaped drive cam driven by the motor through a speed-reducing gear train, the drive cam including a driving edge, a trailing edge and an outer edge having a cam lobe; and a follower cam coaxial with said drive cam and adapted to be rotated thereby, the follower cam being integral with the crank and including a first radially-extending abutment surface disposed to be engaged by the driving edge of the drive cam and a second radially-extending abutment surface disposed to engage the trailing edge of the drive cam, the drive cam being disposed between said abutment surfaces, the angle subtended by the first and second abutment surfaces being greater than that subtended by the driving and trailing edges of the drive cam thereby providing a lost motion connection between said cams, the follower cam further having a periphery including a pair of adjacent lobes separated by a notch.

8. The combination, as set forth in claim 5, in which:
the module includes at least one recess in the outer surface thereof;

the module engaging means includes a finger for engaging a surface of the recess whereby retraction of the slide retracts the module; and the crank is rotatable by drive means coupled to said motor through a gear train having a substantial speed reduction, said drive means being stationary in the operating position of the module, whereby withdrawal of the module from the receptacle is resisted by the stationary drive means.

9. The combination, as set forth in claim 8, in which:
the module includes a normally closed shutter covering the module connector, the shutter being spring-loaded to the closed position and movable to an open position exposing the module connector; and the receptacle connector assembly includes camming means for moving the shutter to the open position as the module approaches the operating position.

10. The combination, as set forth in claim 1, which further includes:

means for providing a first electrical control signal in response to the position of the module transporting means; and means responsive to said first electrical control signal for controlling the actuation of the module transporting means.

11. The combination, as set forth in claim 10, which further includes:

means for providing a second electrical control signal in response to the coupling status of the receptacle and module connectors, said actuation controlling means being responsive to both said first and second control signals.

12. The combination, as set forth in claim 1, in which:
the receptacle has an electrical connector assembly which includes the receptacle connector, said connector assembly being floatingly coupled to said receptacle so as to be shiftable within limits relative to the receptacle, said receptacle connector assembly further including means for guiding said connector assembly relative to the module connector and aligning the receptacle connector relative to the module connector to facilitate coupling of the connectors as the module approaches the operating position.

13. The combination, as set forth in claim 1, in which:
the module and receptacle include corresponding surfaces for properly orienting said module in said receptacle.

14. The combination, as set forth in claim 13, in which:

the module and receptacle have generally rectangular cross sections and include corresponding longitudinally-extending beveled edges comprising the orienting surfaces.

15. In a microcomputer system having electronic information and control signal processing circuits and disk drive power, data and control circuits, the combination comprising:
a portable hard disk drive module enclosing all of the operative components of the disk drive including at least one disk, a motor for rotating the disk, at least one read/write head for transferring data to and from a surface of the disk and a mechanism for positioning the transducer relative to the disk surface, the module having an electrical connector connected to the control operative components of the disk drive; and
a receptacle for receiving the disk drive module, the receptacle having an electrical connector connected to the disk drive power, data and control circuits and adapted to be coupled to the connector on the disk drive module, the receptacle further including a mechanism having a movable member engageable with the disk drive module to transport the disk drive module (i) to an operating position in response to loading of the disk drive module, the module connector being coupled to the receptacle connector in the operating position of the module and (ii) to an unloading position in response to a command signal from the microcomputer system.

16. A system, as set forth in claim 15, in which:
the electrical connectors comprise the sole interface between the operative components of the disk drive module and the microcomputer system.

17. A system, as set forth in claim 13, in which:
the transport mechanism includes means for locking the module in the operating position.

18. In a microcomputer system having information and control signal processing circuits including disk drive power, data and control circuits, the system including a receptacle adapted to receive a hard disk drive module, the receptacle having an electrical connector connected to the disk drive power, data and control circuits and adapted to receive a mating connector on the disk drive module, the receptacle further including a transport mechanism having a movable member releasably engageable with the disk drive module to move the disk drive module to an operating position in response to loading of the disk drive module and from the operating position to an unload position in response to a command signal from the microcomputer system.

19. A system, as set forth in claim 18, in which:
the transport mechanism further includes means for locking the module in the operating position preventing its manual withdrawal from the receptacle.

20. A system, as set forth in claim 18, in which:
the receptacle connector comprises the sole interface between the operative components of the disk drive and the remainder of the microcomputer system.

21. A system, as set forth in claim 18, which includes:
means for monitoring the position of the transport mechanism and for providing an output representing said position; and
means responsive to the position-monitoring means and to the connection status of the receptacle and module connectors for controlling the actuation and de-actuation of the transport mechanism.

22. A system, as set forth in claim 18, which further includes:
a motor; and in which
the module-engaging member is operable to translate the module linearly between said load position and said operating position, and between said operating position and said unload position; and further includes:
means coupling the motor and module-engaging member or converting rotary to linear motion.

23. In a microcomputer system including disk drive power, data and control circuits, the combination comprising:
a removable, portable hard disk drive module enclosing all of the operative components of the disk drive and including an electrical connector coupled to the operative components of the disk drive;
a receptacle for receiving the disk drive module and having an electrical connector coupled to the disk drive power, data and control circuits, the module having an operating position within the receptacle, the module connector being adapted to receive the receptacle connector in said operating position;
a transport mechanism having a member engageable with the module to move the module from a module load position to said module operating position, and from said operating position to a module unload position;
means for monitoring the connection status of said module and receptacle connectors and for providing an output indicating said status;
means for monitoring the position of the transport mechanism and for providing an output representing said position; and
means responsive to the output of the connection-monitoring means and to the output of the position-monitoring means for controlling the actuation and de-actuation of the transport mechanism.

24. The combination, as set forth in claim 23, in which:
the module and receptacle connectors comprise the sole interface between the operative components of the disk drive and the remainder of the microcomputer system.

25. The combination, as set forth in claim 23, in which:
the connection-monitoring means comprises a conductive loop which is closed when the module is in the operating position and open when the module is not in the operating position.

26. The combination, as set forth in claim 23, which further includes:
a motor; and in which
the module-engaging member is operable to translate the module linearly between said positions; and which further includes:
means coupling the motor and module-engaging means for converting rotary to linear motion, said position-monitoring means comprising a cam and a switch actuable by the cam, said cam being rotatable by said motion-converting means.

27. The combination, as set forth in claim 26, which further includes:
means for dynamically braking said motor in response to a signal from said switch indicating that the transport mechanism has arrived at said operating position and in response to a signal from said switch indicating that the transport mechanism has arrived at said unload position.

28. The combination, as set forth in claim 23, in which:
said transport mechanism includes means for locking the module in the operating position to prevent manual withdrawal thereof from the receptacle.

29. The combination, as set forth in claim 23, in which:
the transport mechanism is actuated to move the module from the load position to the operating position in response to manual insertion of the module to the load position, and said transport mechanism is actuated to move the module from the operating position to the unload position in respone to a command from the microcomputer system.

30. The combination, as set forth in claim 23, in which:
said transport mechanism controlling means includes a microprocessor.

31. The combination, as set forth in claim 23, in which:
the transport mechanism controlling means comprises a microprocessor;
the connection monitoring means comprises a conductive loop adapted to be formed by the connectors, the loop being closed when the module is in the operating position and open when the module is not in the operating position; and
the transport mechanism position monitoring means comprises a cam assembly having a plurality of lobes and a switch positioned to be actuated by said lobes, the connection status of the loop and the state of the cam assembly-actuated switch comprising inputs to the microprocessor.

32. The combinationm, as set forth in claim 31, in which:
the cam assembly has first and second lobes; and
the transport mechanism has an initial position in which the switch is actuated by the first lobe and the connector loop is open, the transport mechanism being actuable to move the module from the load position to the operating position in response to de-actuation of the switch while the loop remains open, the transport mechanism being de-actuated when it reaches the operating position in response to actuation of the switch by the second lobe and closing of the connector loop, the transport mechanism being actuated to move the module from the operating position toward the unload position upon receipt by the microprocessor of an eject command, the transport mechanism being de-actuated at the unload position response to actuation of the switch by the first lobe.

33. The combination, as set forth in claim 32, in which:
the cam assembly has a third lobe adjacent the first lobe and separated therefrom by a notch, the switch being disposed to be actuated by said third lobe as the transport mechanism approaches the unload position, the transport mechanism being moved at reduced speed in response to said last-mentioned actuation of said switch, the transport mechanism being stopped in response to actuation of the switch by the first lobe following de-actuation by said notch.

34. The combination, as set forth in claim 33, in which:
the cam assembly comprises a drive cam having the second lobe and a follower cam, adapted to be driven by said drive cam, having the first and third lobes, a lost motion connection coupling the drive and follower cams.

35. The combination, as set forth in claim 34, in which:
the notch is of shorter length than any other feature of the cam assembly; and
the transport mechansim is operable to follow an initializing sequence in response to the absence of actuation of the switch upon start-up of the microcomputer system, said notch length providing a reference for determining the position of the cam during the initializing sequence.

36. In a microcomputer system including disk drive power, data and control circuits, the combination comprising:
a portable removable hard disk drive module enclosing all of the operative components of the disk drive, said components including a disk and a transducer operatively associated with each surface of the disk, the module including an electrical connector connected to the operative components of the disk drive, the module further including shock and vibration resistant means protecting the disk drive components against damage due to handling of the portable module; and
a receptacle for receiving the disk drive module and having an electrical connector connected to the disk drive power, data and control circuits, the module being insertable into and removable from the receptacle by the user of the microcomputer system, the module having an operating position within the receptacle, the module connector being adapted to receive the receptacle connector in said operating position, the electrical connectors comprising the sole interface between the operative components of the disk drive and the remainder of the microcomputer system said shock and vibration resistant means including means operatively associated with the transducers for unloading the transducers from the disk surfaces when the module is removed from the receptacle.

37. The combination, as set forth in claim 36, in which:
the module is insertable into the receptacle to a load position;
and which combination includes:
a transport mechanism, the module being movable by the transport mechanism from the load position to the operating position and from the operating position to a module unload position from which position the module may be manually removed from the receptacle.

38. A removable, portable micro hard disk drive module adapted for use with a microcomputer system having electronic information and control signal processing circuits and disk drive power, data and control circuits, the module comprising:
an enclosure;
a chassis mounted within the enclosure;
a micro hard disk drive assembly carried by the chassis and including all of the operative components of the disk drive including at least one disk, at least one transducer operatively associated with the disk for transferring data to and from the disk, a motor coupled to the disk for rotating the disk, a mechanism for positioning the transducer along the disk and electronic control and data circuits connected to the transducer, the disk motor and positioning mechanism;

means operatively associated with the disk drive assembly for protecting the disk drive components against shock and vibration due to handling of the portable module, said shock and vibration protecting means including means operatively associated with the transducer for unloading the transducer from the disk when the module is removed from the microcomputer system; and an electrical connector connected to the electronic control and data circuits, the connector being adapted to be releasably coupled to a mating electrical connector connected to the disk drive power, data and control circuits of the microcomputer system, the electrical connector being the sole interface between the operative components of the disk drive assembly and said last mentioned circuits.

39. A module, as set forth in claim 38 in which:
the enclosure includes means adapted to be engaged by a transport mechanism, the module being movable by the transport mechanism between a module load position and a module operating position in the microcomputer system.

40. A module, as set forth in claim 39, in which:
the enclosure has an outer surface including at least one recess, a surface of the recess comprising the means adapted to be engaged by said transport mechanism.

41. A module, as set forth in claim 40, in which:
the enclosure includes front, side and rear walls, the recess being formed in one of the side walls and the electrical connector being adjacent the rear wall.

42. A module, as set forth in claim 41, in which the rear wall includes a spring-loaded shutter covering the electrical connector.

43. A module as set forth in claim 42, in which:
the disk drive is coupled to the chassis by mounts providing shock and vibration resistance in substantially all directions.

44. A method of controlling the motion of a mechanism for transporting a removable hard disk drive module within a receptacle in a microcomputer system between a module load position and a module operating position and between the operating position and a module unload position, the receptacle having an electrical connector and the module having an electrical connector, said connectors being adapted to be coupled in the operating position of the module, the method comprising the steps of:

monitoring the position of the transport mechanism;
monitoring the connection status of the electrical connectors;
inserting the module into the receptacle to the load position;
initiating retraction of the transport mechanism when the transport mechanism is in the load position and the connectors are disconnected to move the module from the load position to the operating position and continuing retraction of the transport mechanism during the presence of these conditions;
stopping retraction of the transport mechanism when the transport mechanism is in the operating position and the connectors are connected;
initiating advancement of the transport mechanism when the transport mechanism is in the operating position, the connectors are connected and an eject command is present to move the transport mechanism from the operating position to the unload position, and continuing said advancement of the transport mechanism;
stopping advancement of the transport mechanism when the transport mechanism is in the unload position; and
withdrawing the module from the receptacle.

45. A compact removable portable micro hard disk drive module adapted to be received in a receptacle associated with a microcomputer system, said system having electronic information and control signal processing circuits and disk drive power, data and control circuits, the module comprising:

a micro hard disk drive having operative components including at least one disk, a motor for rotating the disk, at least one read/write transducer for transferring data to and from the disk and a mechanism for positioning the transducer relative to the disk;

a printed circuit board mounted on the drive, said printed circuit board carrying electronic control and data circuits coupled to the drive;

a chassis carrying said disc drive and printed circuit board;

an enclosure housing said chassis;

means associated with the drive for protecting the drive components against shock and vibration to permit handling of the module without risk of damage to the transducer and disk when the module is removed from the receptacle, said shock and vibration protecting means including anti-shock means coupling the disk drive to the chassis and means operatively associated with the transducer for unloading the transducer from the disk when the module is removed from the receptacle; and an electrical connector mounted in the enclosure, said connector being electrically connected to the printed circuit board circuits and being adapted to be releasably coupled to the microcomputer system circuits.

46. A disk drive module, as defined in claim 45, in which:
the enclosure comprises generally rectangular front, rear and side walls in close proximity to the chassis, said electrical connector being mounted within the confines of the enclosure adjacent said rear wall.

47. A disk drive module, as defined in claim 46, in which:
the enclosure defines means for orienting said module relative to said receptacle.

48. A disk drive module, as defined in claim 47, in which:
said side walls includes longitudinally-extending side edges, said module-orienting means comprising a bevel defined by one of the side edges.

49. A disk drive module, as defined in claim 45, in which:
the enclosure includes means adapted to be engaged by a transport mechanism, the module being movable by the transport mechanism between a module load position and a module operating position in said receptacle.

50. A disk drive module, as set forth in claim 50, in which:
the enclosure has an outer surface including at least one recess, the surface of the recess comprising the means adapted to be engaged by said transporting mechanism.

51. A disk drive module, as set forth in claim 51, in which:
the enclosure includes front, side and rear walls, the recess being formed in one of the side walls.

52. A disk drive module, as defined in claim 52, in which:
the rear wall includes a spring-loaded shutter covering the electrical connector, said shutter being movable to an open position exposing said connector.

53. A compact, portable micro hard disk drive module adapted to be received in a receptacle associated with a microcomputer system, said system having electronic information and control signal processing circuits and disk drive power, data and control circuits, the module comprising:
a micro hard disk drive;
a printed circuit board mounted on the drive, said printed circuit board carrying electronic control and data circuits coupled to the drive;
a chassis carrying said disk drive and printed circuit board;
an enclosure housing said chassis, the enclosure including a surface adapted to be engaged by means for transporting the module between a module load position and a module operating position in the receptacle;
means associated with the drive for protecting the drive components against shock and vibration; and
an electrical connector mounted in the enclosure, said connector being electrically connected to the printed circuit board circuits and being adapted to be releasably coupled to the microcomputer system circuits when the module is moved to the operating position in the receptacle.

54. A compact, portable micro hard disk drive module for use with a microcomputer system and interchangeable between such systems, said module comprising:
an enclosure having generally rectangular front, rear and side walls, said rear wall having an opening;
a chassis mounted within said enclosure and in close proximity thereto;
a micro hard disk drive assembly carried by the chassis and including at least one disk, a transducer means operatively associated with the disk for transferring data to and from the disk, a motor coupled to the disk for rotating the disk, a mechanism for positioning the transducer along the disk and electronic control and data circuits connected to the transducer, the disk motor and positioning mechanism;
means operatively associated with the disk drive assembly for protecting the disk drive assembly components against shock and vibration, said shock and vibration protection means including anti-shock mounts coupling the disk drive to the chassis;
an electrical connector mounted within the enclosure in alignment with and adjacent to the opening in said rear wall, said connector being electrically coupled to said electronic control and data circuits; and
the rear wall including a spring loaded shutter interposed between said opening and the electrical connector, said shutter being normally biased to a closed position and movable to an open position exposing the electrical connector.

55. For use in a microcomputer system having disk drive power, data and control circuits, the combination comprising:
a removable, portable hard disk drive module including:
(a) an enclosure containing an antishock-mounted hard disk drive, the enclosure having front, side and rear walls; and
(b) a multi-pin electrical connector mounted adjacent the rear wall of the enclosure and connected to control the operative components of the disk drive; and
a receptacle for receiving the disk drive module, the receptacle including:
(a) a front end and a rear end, the disk drive module being insertable into the front end;
(b) a multi-pin electrical connector mounted adjacent the rear end of the receptacle and adapted to be connected to the disk drive power, data and control circuits of the microcomputer system, the module connector being adapted to be coupled to the receptacle connector when the module is in an operating position within the receptacle, one of said connectors being floatingly mounted to facilitate the coupling of the connectors; and
(c) a mechanism for transporting the module in the recptacle from a module load position to the module operating position and from the operating position to a module unload position in which the module may be removed from the receptacle, the transport mechanism including:
(1) means for engaging the module;
(2) a motor; and
(3) a gear train coupling the motor and the module-engaging
means, the gear train having a substantial
speed reduction.

56. For use in a microcomputer system having disk drive power, data and control circuits, the combination comprising:
a removable, portable hard disk drive module including:
(a) a generally rectangular enclosure containing a hard disk drive carried by antishock and vibration mounts, the enclosure having front, side and rear walls, one of the side walls having formed therein at least one recess defining an inwardly extending surface and the rear wall having an opening; and
(b) a multi-pin electrical connector mounted within the enclosure adjacent the opening in the rear wall and connected to control the operative components of the disk drive; and
a generally rectangular receptacle for receiving the disk drive module, the receptacle including:
(a) a front end, a rear end and side walls, the disk drive module being insertable into and removable from the front end;
(b) a multi-pin electrical connector mounted adjacent the rear end of the receptacle and adapted to be connected to the disk drive power, data and control circuits of the microcomputer system, the module connector being adapted to be coupled to the receptacle connector when the module is in an operating position within the receptacle, the connectors having mating guide means and one of said connectors being floatingly mounted to facilitate the coupling of the connectors; and (c) a transport mechanism mounted on the receptacle for linearly transporting the module in the receptacle from a module load position to the module operating position and from the operating position to a module unload position in which the module may be removed from the receptacle, the transport mechanism including:

(1) a reciprocable slide along one of the side walls of the receptacle; a finger pivotally-mounted on the slide for engaging the inwardly-extending surface of the recess in the side wall of the module and moving the module from the load position to the operating position; and a post projecting from the slide for engaging the rear wall of the module enclosure and moving the module from the operating position to the unload position;

(2) a motor; and (3) a gear train coupling the motor and the reciprocable slide, the gear train having a substantial speed reduction.

57. For use in a microcomputer system having disk drive power, data and control circuits, the combination comprising:

a receptacle for receiving a removable, portable disk drive module containing a micro hard disk drive and having an electrical connector connected to the operative components of the disk drive, the receptacle including:

(a) a front end and a rear end, the disk drive module being insertable into and removable from the front end; and (b) a multi-pin electrical connector mounted adjacent the rear end of the receptacle and adapted to be connected to the disk drive power, data and control circuits of the microcomputer system, the receptacle connector being adapted to be coupled to the module connector when the module is in an operating position within the receptacle; and a transport mechanism mounted on the receptacle for transporting the module from a module load position to a module operating position and from the operating position to a module unload position in which the module may be removed from the receptacle, the transport mechanism including:

(a) means for engaging the module;

(b) a motor; and (c) a gear train coupling the motor and the module-engaging means.

58. The combination, as defined in claim 57, in which: the module-engaging means includes a reciprocable slide and a crank assembly for driving the slide, the crank assembly being actuated by the gear train.

59. The combination, as defined in claim 57, in which: the gear train has a substantial speed reduction so as to provide sufficient force to couple the module and receptacle connectors.

60. For use in a microcomputer system having disk drive power, data and control circuits, the combination comprising:

a removable, portable hard disk drive module including:

(a) an enclosure containing a shock and vibration resistant hard disk drive, the enclosure having front, side and rear walls; and (b) a multi-pin electrical connector mounted adjacent the rear wall of the enclosure and connected to control the operative components of the disk drive; and a receptacle for receiving the disk drive module, the receptacle including:

(a) a front end and a rear end, the disk drive module being insertable into the front end;

(b) a multi-pin electrical connector mounted adjacent the rear end of the receptacle and adapted to be connected to the disk drive power, data and control circuits of the microcomputer system, the module connector being adapted to be coupled to the receptacle connector when the module is in an operating position within the receptacle; and (c) a mechanism for transporting the module In the receptacle from a module load position to the module operating position, the transport mechanism including:

(1) means for engaging the module;

(2) a motor; and (3) a gear train coupling the motor and the moduleengaging means, the gear train having a substantial speed reduction.

61. In a microcomputer system including disk drive power, data and control circuits, the combination comprising:

a removable, portable hard disk drive module enclosing a shock and vibration resistant micro hard disk drive and including an electrical connector connected to the operative components of the disk drive;

a receptacle for receiving the disk drive module and having an electrical connector connected to the disk drive power, data and control circuits, the module being insertable into and removable from the receptacle by the user of the microcomputer system, the module having an operating position within the receptacle, the module connector being adapted to receive the receptacle connector in said operating position, the electrical connectors comprising the sole interface between the operative components of the disk drive and the remainder of the microcomputer system, and means for transporting the module from a module load position to said module operating position and from said operating position to a module unload position, the module transporting means being actuatable to transport the module from the load position to the opening position in response to manual loading of the module, and from the operating position to the unload position in response to a command signal from the microcomputer system.

62. The combination as set forth in claim 61, in which: the module transporting means includes means for locking the module in the operating position to prevent withdrawal of the module from the receptacle.

63. For use in a microcomputer system having disk drive power, data and control circuits, the combination comprising:

a removable, portable hard disk drive module including:

(a) an enclosure containing an antishock-mounted hard disk drive, the enclosure having front, side and rear walls, one of the side walls including at least one recess in the outer surface thereof; and (b) a multi-pin electrical connector mounted adjacent the rear wall of the enclosure and connected to control the operative components of the disk drive; and a receptacle for receiving the disk drive module, the receptacle including:

(a) a front end and a rear end, the disk drive module being insertable into the front end;

(b) a multi-pin electrical connector mounted adjacent the rear end of the receptacle and adapted to be connected to the disk drive power, data and control circuits of the microcomputer system, the module connector being adapted to be coupled to the receptacle connector when the module is in an operating position within the receptacle, one of said connectors being floatingly mounted to facilitate the coupling of the connectors; and (c) a mechanism for transporting the module in the receptacle from a module load position to the module operating position and from the operating position to a module unload position in which the module may be removed from the receptacle, the transport mechanism including:

(1) means for engaging the module, the module-engaging means including a finger for engaging a surface of the recess in the one side wall of the enclosure, whereby retraction of the module-engaging means retracts the module to the operating position;

(2) a motor; and (3) a gear train coupling the motor and the module-engaging means, the gear train having a substantial speed reduction.

64. For use in a microcomputer system including disk drive power, data and control circuits, the combination comprising:

a portable hard disk drive module having front, rear and side walls, the rear wall having an opening, the disk drive module enclosing a micro hard disk drive having disk drive operative components including at least one disk, transducer means operatively associated with the disk for transferring data to and from the disk, a motor coupled to the disk for rotating the disk and a mechanism for positioning the transducer means along the disk, the module including shock and vibration resistant means protecting the disk drive components against damage due to handling of the portable module, the module further including an electrical connector adjacent the opening in the rear wall and connected to control the operative components of the disk drive; and a receptacle having side walls and front and rear ends, the receptacle having an electrical connector mounted adjacent the rear end and adapted to be connected to the disk drive power, data and control circuits, the module being insertable into and removable from the front end of the receptacle and having an operating position within the receptacle, the module and receptacle connectors being coupled when the module is in the operating position said shock and vibration resistant means including means operatively associated with the transducer means for unloading the transducer means from the disk when the module is removed from the receptacle.

65. The combination, as defined in claim 64, in which:
one of the electrical connectors is floatingly mounted to facilitate connection of the connectors.

66. The combination, as defined in claim 64, in which:
the module and receptacle include corresponding surfaces assuring proper orientation of the module in the receptacle.

67. The combination, as defined in claim 64, in which:
the rear wall of the module includes a spring-loaded shutter covering the opening, the shutter being movable to an open position exposing the module connector.

68. The combination, as defined in claim 64, in which:
the electrical connectors comprise the sole interface between the disk drive circuits of the microcomputer system and the operative components of the disk drive.

69. A compact, removable portable micro hard disk drive module adapted to be received in a receptacle associated with a microcomputer system, said system having electronic information and control signal processing circuits and disk drive power, data and control circuits, the module comprising:

a micro hard disk drive having operative components including at least one disk, transducer means operatively associated with the disk for transferring data to and from the disk, a motor coupled to the disk for rotating the disk and a mechanism for positioning the transducer means along the disk;

a chassis carrying the disk drive;

an enclosure housing the chassis and disk drive, the enclosure having generally rectangular front, rear and side walls, the rear wall having an opening, the enclosure including means for orienting the module relative to the receptacle;

shock and vibration resistant means within the enclosure and operatively associated with the disk drive, the shock and vibration resistant means protecting the disk drive components against damage due to handling of the portable module said shock and vibration resistant means including anti-shock means coupling the disk drive to the chassis and means operatively associated with the transducer means for unloading the transducer means from the disk when the module is removed from the receptacle; and an electrical connector mounted adjacent the opening in the rear wall and connected to control the operative components of the disk drive, the connector being adapted to be coupled to the microcomputer system circuits.

70. The module, as defined in claim 69, in which:
the electrical connector is disposed within the confines of the enclosure;
and which includes:
a shutter mounted on the rear wall of the enclosure and normally covering the opening, the shutter being movable to an open position to expose the electrical connector.

71. In a microcomputer system including disk drive power, data and control circuits, the combination comprising:
a hard disk drive module enclosing all of the operative components of the disk drive and including an electrical connector connected to the operative components of the disk drive;

a receptacle for receiving the disk drive module and having an electrical connector connected to the disk drive power, data and control circuits, the module being insertable into the receptacle to a load position by the user of the microcomputer system, the module having an operating position within the receptacle, the module connector being adapted to receive the receptacle connector when the module is moved to said operating position, the electrical connectors comprising the sole interface between the operative components of the disk drive and the remainder of the microcomputer system; and a transport mechanism engageable with the module, the module being movable by the transport mechanism from the load position to the operating position.

72. The combination, as set forth in claim 71, in which:

the module is movable by the transport mechanism from the operating position to a module unload position from which position the module may be manually removed from the receptacle.

73. A removable, portable micro hard disk drive module adapted for use with a microcomputer system having electronic information and control signal processing circuits and disk drive power, data and control circuits, the module comprising:

an enclosure having a surface engageable by a transport mechanism, the module being adapted to be moved by the transport mechanism between a module load position and a module operating position relative to the microcomputer system in response to command signals from said microcomputer system;

a chassis mounted within the enclosure;

a micro hard disk drive assembly carried by the chassis and including all of the operative components of the disk drive including at least one disk, at least one transducer operatively associated with the disk for transferring data to and from the disk, a motor coupled to the disk for rotating the disk, a mechanism for positioning the transducer along the disk and electronic control and data circuits connected to the transducer, the disk motor and positioning mechanism; and an electrical connector connected to the electronic control and data circuits, the connector being adapted to be releasably coupled to a mating electrical connector connected to the disk drive power, data and control circuits of the microcomputer system, the electrical connector being the sole interface between the operative components of the disk drive assembly and said last mentioned circuits.

* * * * *